UNITED STATES PATENT OFFICE.

JAMES DURIE, OF ELMIRA, NEW YORK.

METHOD OF REDUCING METALLIC SULFIDS.

SPECIFICATION forming part of Letters Patent No. 624,000, dated May 2, 1899.

Application filed February 2, 1898. Serial No. 668,880. (No specimens.)

*To all whom it may concern:*

Be it known that I, JAMES DURIE, a subject of the Queen of Great Britain, residing at the city of Elmira, in the county of Chemung and State of New York, have invented a new and useful Improvement in Methods for the Reduction of Metallic Sulfids; and I declare the following to be a full, clear, and exact description of the invention.

My invention has for its object the employment in the reduction of the said metallic sulfids of novel means or solutions by which the separation of the various components of the sulfids may be effected at a reduced cost, whereby ores of inferior grades may be employed with advantage.

At present many of the metallic sulfids are reduced by the action of nitric acid, whereas I use a solution of sulfuric acid and a nitrate of an alkali metal, such as nitrate of sodium, as hereinafter set forth. In following out my invention, for example, take galena ore and grind it to a powder, then add in the proportion of two pounds of the ore one pound of sulfuric acid, ($H_2SO_4$,) 1.84 specific gravity, one pound of sodium nitrate, and four pounds water and subject it in any ordinary steam-jacketed vessel to the action of heat up to 212° Fahrenheit or by injecting steam into the solution. As a result the galena ore will be dissolved, the lead being precipitated in the form of lead sulfate, ($PbSO_4$,) other metals therein—such as zinc, copper, &c.—going into solution as nitrates or sulfates, the sulfur also being precipitated. The lead sulfate is then filtered and washed with water in the usual manner in any ordinary vessel or trough and is dissolved by a solution of a caustic alkali, such as sodium hydrate, (NaHO,) potassium hydrate, (KHO,) or by a solution of ammonium acetate, ($NH_4C_2H_3O_2$,) or sodium acetate, ($NaC_2H_3O_23H_2O$.) The solution thus obtained, if alkaline, may be acidified by nitric acid or acetic acid, and by adding a carbonate or bicarbonate of sodium or carbonate of ammonia or by injecting carbon dioxid, ($CO_2$,) a precipitate of hydrated carbonate of lead will be obtained, which is washed with water and dried in any usual manner known in the art, forming thereby the dried white lead of commerce. Instead of using carbon dioxid or a substance containing it for obtaining a precipitate of hydrated carbonate of lead I may substitute bichromate of potassium or sodium to form chrome-yellow. The solid residue which remains contains the impurities of the ore and also of the metals which are insoluble in nitric acid and the sulfur of the galena and of the sulfuric acid employed. Said sulfur is recovered by burning off and subliming in the usual way, or it may be separated by washing with water, taking advantage of the different specific gravities of the substances, as in the ordinary gravity separators.

The filtrate containing the zinc, copper, &c., may be treated for their recovery by any well-known process, and the sulfate of sodium or sulfate of potassium formed in the process may be recovered and may be re-formed into sodium carbonate or potassium carbonate. In the event of there being in the ore any metallic sulfid not attacked by a mixture of sulfuric acid and a nitrate I add the chlorid of sodium in the same proportion as the nitrate. This solution obtains a much more rapid reduction of the sulfid ore, acting somewhat similar to aqua regia or a mixture of nitric and hydrochloric acids. This is of value in the treating of sulfids containing gold, platinum, and other metals soluble in aqua regia as being more simple than the present chlorination process and demonstrates that the sulfid has the same effect as a high temperature in the formation of nitric acid and in the liberation of chlorin, as in the present process of nitric-acid and hydrochloric-acid manufacture, by either using sulfuric acid and sodium nitrate or sulfuric acid and sodium chlorid, respectively. In the reduction of some sulfids I use a solution of sulfuric acid and a chlorid salt, such as sodium chlorid, (NaCl,) instead of using hydrochloric acid; but in this case the sulfur will not be recovered.

I would state that many of the metallic sulfids are reduced by the action of nitric acid, which in the case of galena ore is reduced by nitric acid, ($HNO_3$,) part of the lead going into solution as nitrate of lead and the rest remaining insoluble lead sulfate, other metals—such as zinc, copper, and silver—going into solution as nitrates. This is well known; but instead of the nitric acid, which costs from three and one-half dollars to five and one-half dollars per hundred pounds, a solution of commercial sulfuric acid and nitrate of sodium or nitrate of potassium will cost not over half that sum, and by applying a moderate amount of heat up to 212° Fahrenheit the ore under treatment is readily and quickly decomposed, as well as the other sulfids in the ore, such as pyrites of copper or iron.

Although I have stated the temperature of 212° Fahrenheit as a convenient temperature, I do not wish to limit myself to this temperature, as it might be advantageous to raise the temperature to evaporate the acids employed or formed in the process.

Having thus described my invention, what I claim as new, and desire to secure by Letters Patent, is—

In the process of causing the solution of metallic sulfids containing lead, subjecting the sulfid ore to a solution of sulfuric acid and a nitrate of an alkali metal at a temperature of about 212° Fahrenheit, washing and filtering the lead sulfate obtained therefrom, dissolving the said sulfate precipitating by carbon dioxid, washing and drying the precipitated hydrated carbonate of lead and recovering the sulfur, substantially as described.

In testimony whereof I have hereunto set my hand this 27th day of January, 1898.

JAMES DURIE.

Witnesses:
 FRANK H. BRINTON,
 HARRY ALLAN.